May 30, 1967 P. M. LLEWELLYN ETAL 3,321,971
LEVEL INDICATING APPARATUS
Filed May 27, 1964
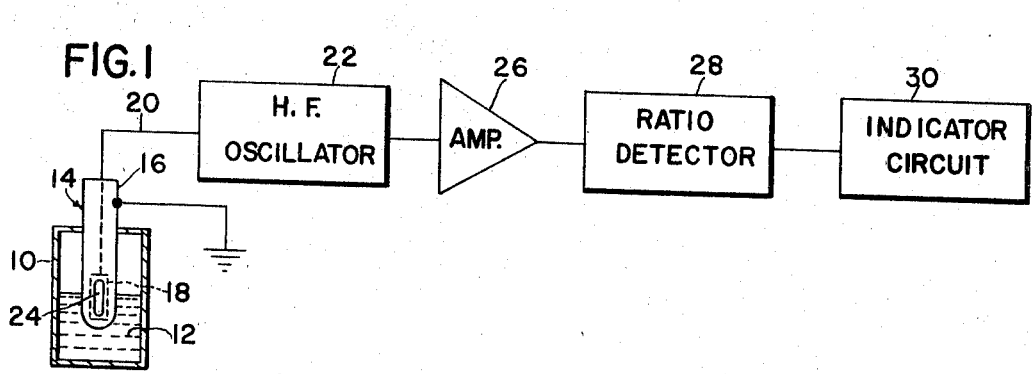
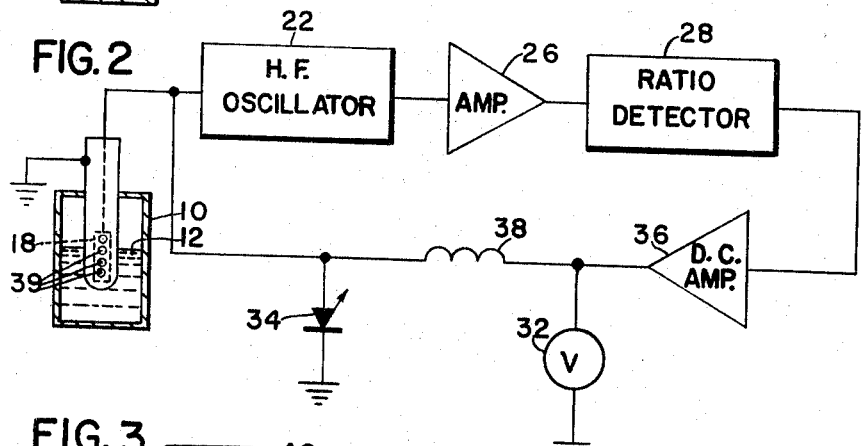
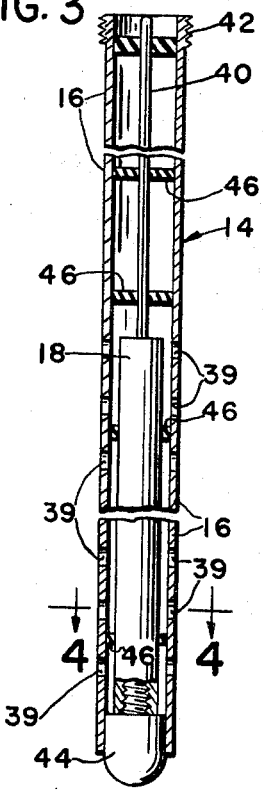
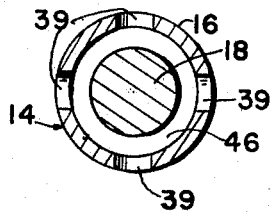
INVENTORS
PETER M. LLEWELLYN
ROBERT C. SHELTON
BY
ATTORNEY

United States Patent Office 3,321,971
Patented May 30, 1967

3,321,971
LEVEL INDICATING APPARATUS
Peter M. Llewellyn, Menlo Park, and Robert C. Shelton, San Mateo, Calif., assignors to Varian Associates, Palo Alto, Calif., a corporation of California
Filed May 27, 1964, Ser. No. 370,583
1 Claim. (Cl. 73—304)

This invention relates to an indicating apparatus and in particular to an apparatus that is useful for measuring the level of any non-conducting liquid.

Cryogenic accessories are used extensively for cooling purposes or to maintain various systems at desired low temperatures. For example, in spectrometer systems using superconducting magnets, liquid nitrogen or liquid helium may be employed to cool the magnet structure which is subject to relatively high heating. However, the coolant liquid generally vaporizes during operation thereby diminishing the liquid with a resultant decrease in effective cooling. In such case, replenishment of the liquid coolant is necessary. But usually the liquid is contained in an opaque, closed vessel, and the liquid level is not readily observable, making it difficult to determine when liquid replacement should be made.

An object of this invention is to provide a novel and improved liquid level indicating apparatus.

Another object of this invention is to provide a novel liquid level sensing device that utilizes electrical capacitance as a measuring parameter.

According to this invention a liquid level indicator apparatus comprises a capacitive sensing device coupled to the tuning circuit of an oscillator, and a ratio detector coupled to the output circuit of the oscillator. Changes in the level of the liquid being measured vary the capacity of the sensing device, which causes variations or a modulation of the frequency of the oscillator output signal. In turn, this frequency modulation is applied to the ratio detector to effect amplitude modulation, which appears as a voltage change. Such a change in voltage serves to indicate the instantaneous level of liquid relative to the sensing device.

In one embodiment of the invention, a binary form of level indicator incorporates an indicating circuit which may be a lamp, by way of example, that is illuminated when the voltage from the ratio detector is greater or less than a certain amplitude. When so illuminated, the operator of the apparatus is apprised that the liquid level has passed a predetermined mark.

In another embodiment of this invention, an analog form of level indicator comprises a negative feedback or servo loop that is coupled between the ratio detector and the capacitive sensing device. The feedback loop, which serves as an automatic frequency control, includes a varactor diode, the capacitance of which is varied as the output voltage from the ratio detector varies. Changes in the capacitance of the varactor compensate for changes in the capacitance of the sensing device, so that the oscillator generates a substantially constant frequency signal. To provide a continuous indication of the varying capacitance sensed by the capacitive sensing device immersed in the liquid and the varying voltage from the ratio detector, which corresponds to the variations in level of the liquid, a voltmeter is coupled between the ratio detector and the varactor diode.

The invention will be described in greater detail with reference to the drawing in which:

FIG. 1 is a schematic and block diagram of an embodiment of the inventive apparatus;

FIG. 2 is a schematic and block diagram of an alternative embodiment in accordance with this invention;

FIG. 3 is a cross sectional view, partly broken away, of a capacitive sensing device, according to this invention; and FIG. 4 is a cross sectional view taken along lines 4—4 of FIG. 3.

Similar numerals refer to similar elements throughout the drawing.

In FIG. 1, an opaque thermally conductive enclosure or tank 10 contains a liquid 12, such as liquid nitrogen or helium, that may be utilized as a coolant or refrigerant. As a result of ambient temperature conditions, the liquid 12 becomes vaporized with a resultant decrease in the liquid level. The tank 10 may have release valves or plugs to permit escape of excess vapor and gas. To maintain the necessary minimum amount of cryogenic liquid, the liquid level is detected and the liquid supply is replenished when a low level is indicated by the apparatus of this invention.

To this end, a capacitive sensing device 14 is positioned within enclosure 10 at a predetermined height relative to the bottom of the enclosure 10. The sensing device 14 has an outer tubular or cylindrical portion 16 and an inner tubular or cylindrical portion 18 concentrically disposed within the outer tube 10. The cylindrical portions 16 and 18 are formed from a metallic substance, such as stainless steel, for example, and together constitute a capacitive structure. The outer tube 16 is coupled to a point of reference potential, such as ground, whereas the inner tube 18 is connected by an insulated conductive lead 20 to the input tuning circuit or series resonant circuit of a high frequency oscillator 22, which generates a high frequency signal, such as 10 Mc./sec.

The outer tube 16 of the capacitive sensing device 14 is permeable to the cryogenic liquid 12 in the tank 10 and thus a quantity of liquid enters the area between the tubes 16 and 18 to a height substantially that of the level of the liquid in the tank 10. The outer tube 16 may have an elongated slot 24 to allow the liquid to run in and vapor to flow out of the area bounded by the tubes 16 and 18. The presence of liquid between the inner wall of tube 16 and outer wall of tube 18 changes the dielectric constant between these walls, which serve as capacitive plates. The effective dielectric constant is changed to an extent determined by the height of the liquid 12 in the capacitive sensing device 14. Such changes in the dielectric constant vary the value of capacitance seen by the tuning circuit of the oscillator 22 and thus varies the frequency of the output signal generated by the oscillator, resulting in a frequency modulated signal.

This frequency modulated signal is passed through an amplifier 26 to a frequency discriminator or ratio detector 28, which serves to convert the frequency modulated signals to amplitude modulation in the form of voltage change, in a well known manner. Whenever the output voltage from detector 26 drops below a threshold value a visual indication, such as an illuminated red lamp is provided by the indicator circuit 30, warning the operator of the apparatus that the level of liquid in the enclosure 10 is too low. Conversely, if the liquid level is sufficient, the indicator circuit 30 displays an illuminated green lamp that apprises the operator that the liquid level is ample.

In the embodiment of the invention depicted in FIG. 2, a continuous measure of liquid level may be obtained by means of a feedback loop incorporating a voltmeter 32 and a varactor diode 34. The outer tube 16 has a series of vertically spaced apertures 39 which allow entry of the liquid into the gap between the tubes 16 and 18, as well as escape of vapor to the tank 10. As the level of the liquid 12 varies in the tank 10, the changing voltage output from the ratio detector 28 is amplified by a D.C.

amplifier 36 and the amplified instantaneous voltage is registered on the voltmeter 32.

However, the signal from the D.C. amplifier is also applied to the varactor diode 34 through a radio frequency choke 38, which prevents alternating current feedback to the oscillator 22. The signal is of such polarity that the varactor diode, which is coupled to ground, always conducts but to a degree determined by the amplitude of the output from the ratio detector 28. The fluctuations in current through the diode 34 causes a change in the total capacitance as seen by the series resonant circuit of the oscillator 22. The diode 34 acts to balance or compensate for changes in capacitance of the sensing device 14 by changing the LC ratio of the series resonant circuit of the oscillator 22 in opposition to the change effected by the sensing device 14. In effect, the oscillator 22 generates a substantially constant frequency signal that serves as a carrier which is frequency modulated by the changing capacitance of the sensing device 14. The voltmeter 32 provides a continuous instantaneous reading of such changing capacitance, and thus of varying liquid level.

FIGS. 3 and 4 illustrate an embodiment of the capacitive sensing device 14 utilized in the present invention. An outer cylindrical tube 16 made from stainless steel, having an inner diameter of approximately .218 inch encompasses an inner cylindrical tube 18 which has a cylindrical height of about 10–12 inches and an outer diameter of approximately .172 inch. The wall of each tube 16 and 18 is about .016 inch thick. The concentrically aligned tubes establish an electrical capacitance with air therebetween of about 83.1 picofarads. When the gap between the tubes is entirely filled with a liquid, such as helium, for example, the measurable change in capacitance is about 2.8 picofarads. The sensing device 14 preferably has a low thermal conductivity.

One end of a conductve wire 40 about .032 inch in diameter is brazed or soldered to the inner tube 18 and the wire is connected at its other end to a coaxial coupler 42. The conductive wire 40 constitutes a low capacity transmission line. The coupler 42 closes the top of the outer cylinder 16, and the bottom of the outer cylinder 16 is closed by a threaded Teflon plug 44 which engages a cooperating threaded portion of the hollow inner tube 18. The coaxial coupler 42 is adapted for connection to ground or other source of reference potential, and for coupling the conductive wire 40 to an output circuit, such as the oscillator 22. Insulating spacer disks 46, that are secured in spaced relationship along the axis of the cylindrical configuration, support the inner tube 18 and conductive wire 40 in a fixed relationship relative to the outer cylinder 16. To ensure that the disks 46 remain immobile the outer cylinder 16 may be crimped at suitable points to retain the disks by compression.

The configuration, materials used, dimensions and other parameters of the sensing device and liquid level sensing apparatus of this invention need not necessarily be limited to those set forth above, but may be varied and modified within the scope of this invention.

What is claimed is:

A liquid level sensing apparatus comprising: a capacitive sensing device for immersion in the liquid to be measured; an oscillator coupled to such sensing device; a ratio detector coupled to the oscillator for providing voltage change in response to change of capacitance of the sensing device; a feedback loop coupled between the output circuit of said ratio detector and the input circuit of said oscillator including a varactor diode for varying the capacitance of the input circuit of said oscillator in opposition to the variations provided by the sensing device; and an indicating means for registering said voltage change.

References Cited
UNITED STATES PATENTS

| | | | |
|---|---|---|---|
| 2,375,084 | 5/1945 | Coroniti | 73—304 |
| 2,477,511 | 7/1949 | Comb | 73—304 |
| 2,657,579 | 11/1953 | Milsom | 73—304 |

LOUIS R. PRINCE, *Primary Examiner.*

S. C. SWISHER, *Assistant Examiner.*